United States Patent
Topol et al.

(10) Patent No.: US 8,632,301 B2
(45) Date of Patent: Jan. 21, 2014

(54) LOW NOISE COMPRESSOR ROTOR FOR GEARED TURBOFAN ENGINE

(71) Applicant: United Technologies Corporation, Hartford, CT (US)

(72) Inventors: David A. Topol, West Hartford, CT (US); Burce L. Morin, Springfield, MA (US)

(73) Assignee: United Technologies Corporation, Hartford, CT (US)

( * ) Notice: Subject to any disclaimer, the term of this patent is extended or adjusted under 35 U.S.C. 154(b) by 116 days.

(21) Appl. No.: 13/630,276

(22) Filed: Sep. 28, 2012

(65) Prior Publication Data

US 2013/0276424 A1    Oct. 24, 2013

Related U.S. Application Data

(63) Continuation-in-part of application No. 13/590,328, filed on Aug. 21, 2012, which is a continuation of application No. 13/403,005, filed on Feb. 23, 2012, now Pat. No. 8,246,292.

(60) Provisional application No. 61/592,643, filed on Jan. 31, 2012.

(51) Int. Cl.
    *F01D 1/02*    (2006.01)

(52) U.S. Cl.
    USPC ..... 415/119; 415/181; 415/198.1; 415/199.4; 416/500; 416/DIG. 2

(58) Field of Classification Search
    USPC ............ 415/119, 181, 198.1, 199.4; 416/500, 416/DIG. 2
    See application file for complete search history.

(56) References Cited

U.S. PATENT DOCUMENTS

| | | | |
|---|---|---|---|
| 3,270,953 A | 9/1966 | Jan Jerie et al. | |
| 3,747,343 A | 7/1973 | Rosen | |
| 3,953,148 A | 4/1976 | Seippel et al. | |
| 4,131,387 A * | 12/1978 | Kazin et al. | 415/119 |
| 4,732,532 A * | 3/1988 | Schwaller et al. | 415/119 |
| 4,883,240 A | 11/1989 | Adamson et al. | |
| 4,968,216 A | 11/1990 | Anderson et al. | |

(Continued)

OTHER PUBLICATIONS

Jane's Aero-Engines, Issue Seven, Copyright 2000, pp. 510-512, Mar. 2000.

*Primary Examiner* — Igor Kershteyn
(74) *Attorney, Agent, or Firm* — Carlson, Gaskey & Olds, PC

(57) ABSTRACT

A gas turbine engine has a fan, a compressor section having a low pressure portion and a high pressure portion, a combustor section, and a turbine having a low pressure portion. The low pressure turbine portion drives the low pressure compressor portion and the fan. A gear reduction effects a reduction in the speed of the fan relative to a speed of the low pressure turbine and the low pressure compressor portion. At least one of the low pressure turbine portion and low pressure compressor portion has a number of blades in each of a plurality of rows. The blades operate at least some of the time at a rotational speed. The number of blades and the rotational speed are such that the following formula holds true for at least one of the blade rows of the at least one of the low pressure turbine portion and/or the low pressure compressor sections: (number of blades×rotational speed)/60≥5500. The rotational speed is an approach speed in revolutions per minute.

20 Claims, 1 Drawing Sheet

(56) References Cited

U.S. PATENT DOCUMENTS

| | | |
|---|---|---|
| 5,169,288 A | 12/1992 | Gliebe et al. |
| 5,486,091 A | 1/1996 | Sharma |
| 6,036,438 A | 3/2000 | Imai |
| 6,195,983 B1 | 3/2001 | Wadia et al. |
| 6,260,794 B1 | 7/2001 | Rowe |
| 6,554,564 B1 | 4/2003 | Lord |
| 7,108,485 B2 | 9/2006 | Wobben |
| 7,694,505 B2 | 4/2010 | Schilling |
| 7,806,651 B2 | 10/2010 | Kennepohl et al. |
| 7,976,283 B2 | 7/2011 | Huck |
| 7,984,607 B2 | 7/2011 | Sharma et al. |

* cited by examiner

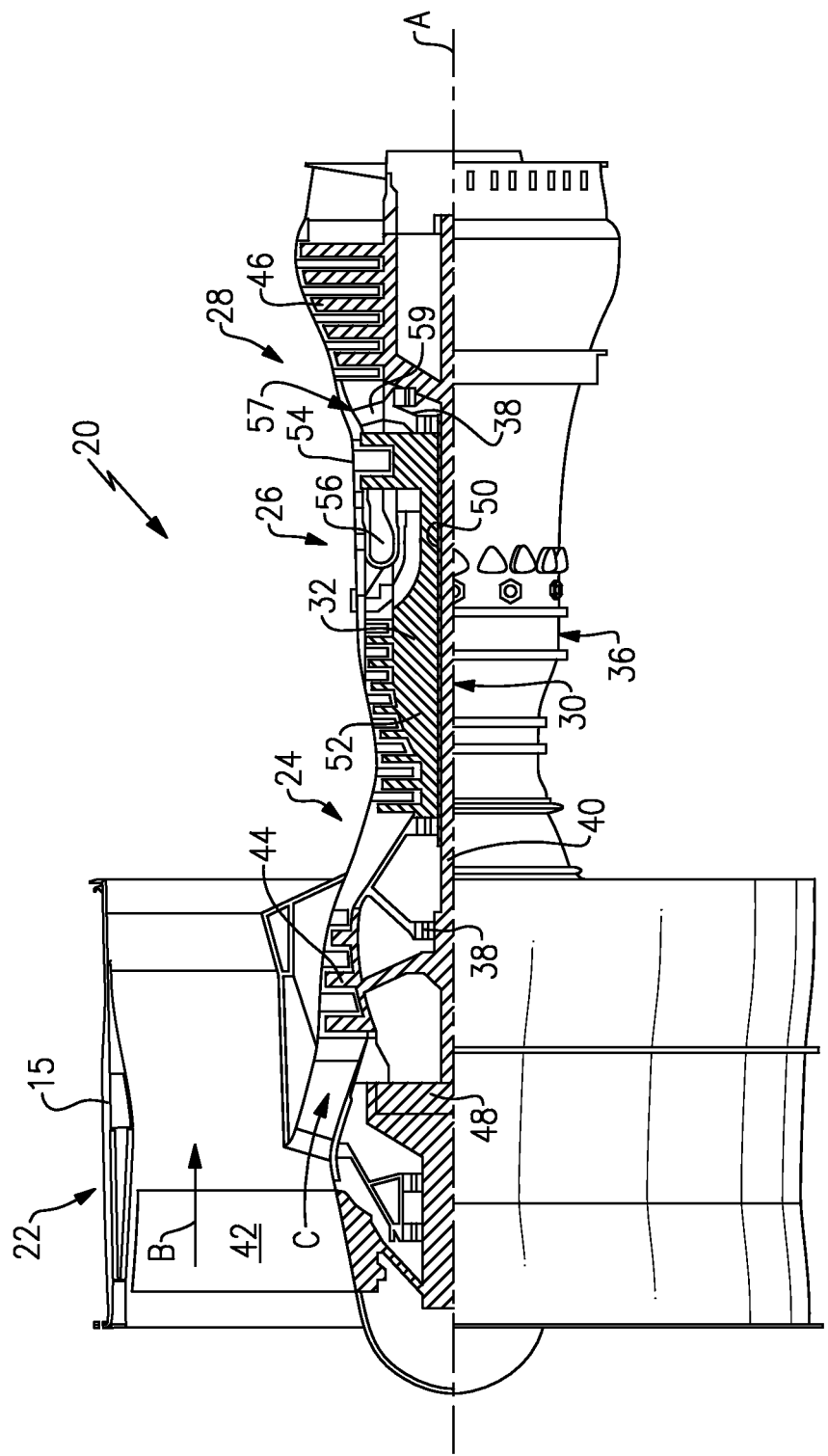

LOW NOISE COMPRESSOR ROTOR FOR GEARED TURBOFAN ENGINE

CROSS-REFERENCE TO RELATED APPLICATION

This application is a continuation-in-part of U.S. patent application Ser. No. 13/590,328, filed Aug. 21, 2012, which is a continuation of U.S. patent application Ser. No. 13/403,005, filed Feb. 23, 2012, now U.S. Pat. No. 8,246,292, issued Aug. 21, 2012, which claims priority to U.S. Provisional Application No. 61/592,643, filed Jan. 31, 2012.

BACKGROUND

This application relates to the design of a gas turbine engine rotor which can be operated to produce noise that is less sensitive to human hearing.

Gas turbine engines are known, and typically include a fan delivering air into a compressor. The air is compressed in the compressor and delivered downstream into a combustor section where it was mixed with fuel and ignited. Products of this combustion pass downstream over turbine rotors, driving the turbine rotors to rotate.

Typically, there is a high pressure turbine rotor, and a low pressure turbine rotor. Each of the turbine rotors include a number of rows of turbine blades which rotate with the rotor. Interspersed between the rows of turbine blades are vanes.

The high pressure turbine rotor has typically driven a high pressure compressor rotor, and the low pressure turbine rotor has typically driven a low pressure compressor rotor. Each of the compressor rotors also include a number of compressor blades which rotate with the rotors. There are also vanes interspersed between the rows of compressor blades.

The low pressure turbine or compressor can be a significant noise source, as noise is produced by fluid dynamic interaction between the blade rows and the vane rows. These interactions produce tones at a blade passage frequency of each of the low pressure turbine rotors, the low pressure compressor rotors, and their harmonics.

The noise can often be in a frequency range that is very sensitive to humans. To mitigate this problem, in the past, a vane-to-blade ratio has been controlled to be above a certain number. As an example, a vane-to-blade ratio may be selected to be 1.5 or greater, to prevent a fundamental blade passage tone from propagating to the far field. This is known as "cut-off."

However, acoustically cut-off designs may come at the expense of increased weight and reduced aerodynamic efficiency. Stated another way, by limiting the designer to a particular vane to blade ratio, the designer may be restricted from selecting such a ratio based upon other characteristics of the intended engine.

Historically, the low pressure turbine has driven both a low pressure compressor section and a fan section. More recently, a gear reduction has been provided such that the fan and low pressure compressor can be driven at distinct speeds.

SUMMARY OF THE INVENTION

In a featured embodiment, a gas turbine engine has a fan, a compressor section having a low pressure portion and a high pressure portion, a combustor section, and a turbine having a low pressure portion. The low pressure turbine portion drives the low pressure compressor portion and the fan. A gear reduction effects a reduction in the speed of the fan relative to a speed of the low pressure turbine and the low pressure compressor portion. At least one of the low pressure turbine portion and low pressure compressor portion has a number of blades in each of a plurality of rows. The blades operate at least some of the time at a rotational speed. The number of blades and the rotational speed are such that the following formula holds true for at least one of the blade rows of the at least one of the low pressure turbine portion and/or the low pressure compressor sections: (number of blades×rotational speed)/60≥5500. The rotational speed is an approach speed in revolutions per minute.

In another embodiment according to the previous embodiments, the formula results in a number greater than or equal to 6000 Hz.

In another embodiment according to any of the previous embodiments, the gas turbine engine is rated to produce 15,000 pounds of thrust or more.

In another embodiment according to any of the previous embodiments, the at least one of the low pressure turbine portion and the low pressure compressor portion is the low pressure compressor portion.

In another embodiment according to any of the previous embodiments, the formula holds true for a plurality of the blade rows of the low pressure compressor portion.

In another embodiment according to any of the previous embodiments, the formula results in a number greater than or equal to 6000.

In another embodiment according to any of the previous embodiments, the gas turbine engine is rated to produce 15,000 pounds of thrust or more.

In another embodiment according to any of the previous embodiments, the gear reduction has a gear ratio of greater than about 2.3.

In another embodiment according to any of the previous embodiments, the gear reduction has a gear ratio of greater than about 2.5.

In another embodiment according to any of the previous embodiments, the fan delivers air into a bypass duct, and a portion of air into the compressor section. A bypass ratio is defined as the volume of air delivered into the bypass duct compared to the volume of air delivered into the compressor section. The bypass ratio is greater than about 6.

In another embodiment according to any of the previous embodiments, the bypass ratio is greater than about 10.

In another embodiment according to any of the previous embodiments, the gear reduction has a gear ratio of greater than about 2.3.

In another embodiment according to any of the previous embodiments, the fan delivers air into a bypass duct, and a portion of air into the compressor section. A bypass ratio is defined as the volume of air delivered into the bypass duct compared to the volume of air delivered into the compressor section. The bypass ratio is greater than about 6.

In another embodiment according to any of the previous embodiments, the bypass ratio is greater than about 10.

In another featured embodiment, a compressor module has a low pressure portion having a number of blades in each of a plurality of rows of the low pressure portion. The blades operate at least some of the time at a rotational speed. The number of blades and the rotational speed are such that the following formula holds true for at least one of the blade rows of the low pressure portion: (number of blades×rotational speed)/60≥5500 Hz. The rotational speed is an approach speed in revolutions per minute.

In another embodiment according to the previous embodiment, the formula results in a number greater than or equal to 6000 Hz.

In another embodiment according to any of the previous embodiments, the gas turbine engine is rated to produce 15,000 pounds of thrust or more.

In another embodiment according to any of the previous embodiments, the formula holds true for a plurality of the blade rows of the low pressure portion.

In another embodiment according to any of the previous embodiments, the formula holds true for all of the blade rows of the low pressure portion.

In another embodiment according to any of the previous embodiments, the formula holds true for a plurality of the blade rows of the low pressure portion.

These and other features of this application will be best understood from the following specification and drawings, the following of which is a brief description.

BRIEF DESCRIPTION OF THE DRAWINGS

FIG. 1 shows a gas turbine engine.

DETAILED DESCRIPTION

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown), or an intermediate spool, among other systems or features. The fan section 22 drives air along a bypass flowpath B in a bypass duct defined within a nacelle 15, while the compressor section 24 drives air along a core flowpath C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The terms "low" and "high" as applied to speed or pressure for the spools, compressors and turbines are of course relative to each other. That is, the low speed spool operates at a lower speed than the high speed spool, and the low pressure sections operate at lower pressure than the high pressures sections.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tambient\ deg\ R)/(518.7)]^{0.5}$. The "Low corrected fan tip speed" as disclosed herein according to one non-limiting embodiment is less than about 1150 ft/second.

The use of the gear reduction between the low speed spool and the fan allows an increase of speed to the low pressure compressor. In the past, the speed of the low pressure turbine and compressor has been somewhat limited in that the fan speed cannot be unduly large. The maximum fan speed is at its outer tip, and in larger engines, the fan diameter is much larger than it may be in smaller power engines. However, the use of the gear reduction has freed the designer from limitation on the low pressure turbine and compressor speeds caused by a desire to not have unduly high fan speeds.

It has been discovered that a careful design between the number of rotating blades, and the rotational speed of the low pressure turbine can be selected to result in noise frequencies that are less sensitive to human hearing. The same is true for the low pressure compressor 44.

A formula has been developed as follows:

(blade count×rotational speed)/60≥5500.

That is, the number of rotating blades in any low pressure turbine stage, multiplied by the rotational speed of the low pressure turbine 46 (in revolutions per minute), divided by 60 should be greater than or equal to 5500. The same holds true for the low pressure compressor stages. More narrowly, the amounts should be above 6000. A worker of ordinary skill in the art would recognize that the 60 factor is to change revolutions per minute to Hertz, or revolutions per one second.

The operational speed of the low pressure turbine 46 and low pressure compressor 44 as utilized in the formula should correspond to the engine operating conditions at each noise certification point defined in Part 36 or the Federal Airworthiness Regulations. More particularly, the rotational speed may be taken as an approach certification point as defined in Part 36 of the Federal Airworthiness Regulations. For purposes of this application and its claims, the term "approach speed" equates to this certification point.

It is envisioned that all of the rows in the low pressure turbine 46 may meet the above formula. However, this application may also extend to low pressure turbines wherein only one of the blade rows in the low pressure turbine meet the above formula. In other embodiments, plural rows meet the formula and in other embodiments, the majority of the rows meet the formula. The same is true for low pressure compressors, wherein all of the rows in the low pressure compressor 44 may meet the above formula. However, the application may extend to low pressure compressors wherein only one of the blade rows in the low pressure compressor meet the above formula. In other embodiments, plural rows meet the formula and in other embodiments, the majority of the rows meet the formula.

This will result in operational noise that would be less sensitive to human hearing.

In embodiments, it may be that the formula can result in a range of greater than or equal to 5500, and moving higher. Thus, by carefully designing the number of blades and controlling the operational speed of the low pressure turbine 46 (and a worker of ordinary skill in the art would recognize how to control this speed) one can assure that the noise frequencies produced by the low pressure turbine are of less concern to humans.

The same holds true for designing the number of blades and controlling the speed of the low pressure compressor 44. Again, a worker of ordinary skill in the art would recognize how to control the speed.

In embodiments, it may be only the low pressure turbine rotor 46, or the low pressure compressor rotor 44 which is designed to meet the meet the above formula. On the other hand, it is also possible to ensure that both the low pressure turbine 46 and low pressure compressor 44 meet the above formula.

This invention is most applicable to jet engines rated to produce 15,000 pounds of thrust or more. In this thrust range, prior art jet engines have typically had frequency ranges of about 4000 hertz. Thus, the noise problems as mentioned above have existed.

Lower thrust engines (<15,000 pounds) may have operated under conditions that sometimes passed above the 4000 number, and even approached 6000, however, this has not been in combination with the geared architecture, nor in the higher powered engines which have the larger fans, and thus the greater limitations on low pressure turbine or low pressure compressor speed.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
a fan, a compressor section having a low pressure portion and a high pressure portion, a combustor section, and a turbine having a low pressure portion, the low pressure turbine portion driving said low pressure compressor portion and the fan;
a gear reduction effecting a reduction in the speed of said fan relative to a speed of the low pressure turbine and the low pressure compressor portion;
at least one of said low pressure turbine portion and said low pressure compressor portion having a number of blades in each of a plurality of rows, and said blades operating at least some of the time at a rotational speed, and said number of blades and said rotational speed being such that the following formula holds true for at least one of the blade rows of said at least one of the low pressure turbine portion and/or the low pressure compressor sections:

(number of blades×rotational speed)/60≥5500; and said rotational speed being an approach speed in revolutions per minute.

2. The gas turbine engine as set forth in claim 1, wherein the formula results in a number greater than or equal to 6000 Hz.

3. The gas turbine engine as set forth in claim 2, wherein said gas turbine engine is rated to produce 15,000 pounds of thrust or more.

4. The gas turbine engine as set forth in claim 1, wherein the at least one of the low pressure turbine portion and the low pressure compressor portion is the low pressure compressor portion.

5. The gas turbine engine as set forth in claim 4, wherein the formula holds true for a plurality of the blade rows of the low pressure compressor portion.

6. The gas turbine engine as set forth in claim 4, wherein the formula results in a number greater than or equal to 6000.

7. The gas turbine engine as set forth in claim 4, wherein said gas turbine engine is rated to produce 15,000 pounds of thrust or more.

8. The gas turbine engine as set forth in claim 4, wherein said gear reduction has a gear ratio of greater than about 2.3.

9. The gas turbine engine as set forth in claim 8, wherein said gear reduction has a gear ratio of greater than about 2.5.

10. The gas turbine engine as set forth in claim 4, wherein said fan delivers air into a bypass duct, and a portion of air into said compressor section, with a bypass ratio defined as the volume of air delivered into the bypass duct compared to the volume of air delivered into the compressor section, and said bypass ratio being greater than about 6.

11. The gas turbine engine as set forth in claim 10, wherein said bypass ratio is greater than about 10.

12. The gas turbine engine as set forth in claim 1, wherein said gear reduction has a gear ratio of greater than about 2.3.

13. The gas turbine engine as set forth in claim 1, wherein said fan delivers air into a bypass duct, and a portion of air into said compressor section, with a bypass ratio defined as the volume of air delivered into the bypass duct compared to the volume of air delivered into the compressor section, and said bypass ratio being greater than about 6.

14. The gas turbine engine as set forth in claim 13, wherein said bypass ratio is greater than about 10.

15. A compressor module comprising:
a low pressure portion having a number of blades in each of a plurality of rows of said low pressure portion, and said blades operating at least some of the time at a rotational speed, and said number of blades and said rotational speed being such that the following formula holds true for at least one of the blade rows of the low pressure portion (number of blades×rotational speed)/60≥5500 Hz; and said rotational speed being an approach speed in revolutions per minute.

16. The compressor module as set forth in claim 15, wherein the formula results in a number greater than or equal to 6000 Hz.

17. The compressor module as set forth in claim 16, wherein said gas turbine engine is rated to produce 15,000 pounds of thrust or more.

18. The compressor module as set forth in claim 17, wherein the formula holds true for a plurality of the blade rows of the low pressure portion.

19. The compressor module as set forth in claim 18, wherein the formula holds true for all of the blade rows of the low pressure portion.

20. The compressor module as set forth in claim 15, wherein the formula holds true for a plurality of the blade rows of the low pressure portion.

* * * * *